US006874901B1

(12) United States Patent
Li

(10) Patent No.: US 6,874,901 B1
(45) Date of Patent: Apr. 5, 2005

(54) LIGHT EMITTING DIODE DISPLAY DEVICE

(75) Inventor: Jui-Tuan Li, Taipei (TW)

(73) Assignee: Joinscan Electronics Co., Ltd., Taipei Hsien (TW)

( * ) Notice: Subject to any disclaimer, the term of this patent is extended or adjusted under 35 U.S.C. 154(b) by 0 days.

(21) Appl. No.: 10/676,023

(22) Filed: Oct. 2, 2003

(51) Int. Cl.[7] .......... G01D 11/28

(52) U.S. Cl. .......... 362/29; 362/240; 362/800; 313/498; 313/512; 313/513

(58) Field of Search .......... 362/29, 555, 240, 362/559, 249, 800; 313/498, 510, 512, 513, 517; 257/434, 787, E33.059

(56) References Cited

U.S. PATENT DOCUMENTS 4,152,624 A * 5/1979 Knaebel .......... 313/499
5,274,570 A * 12/1993 Izumi et al. .......... 716/1
5,938,312 A * 8/1999 Ishinaga .......... 362/29
6,536,913 B1 * 3/2003 Yajima et al. .......... 362/231
2004/0036819 A1 * 2/2004 Ryu et al. .......... 349/58

FOREIGN PATENT DOCUMENTS

GB 2164189 A * 3/1986 .......... G09F/13/00

* cited by examiner

*Primary Examiner*—Haissa Philogene
(74) *Attorney, Agent, or Firm*—Bacon & Thomas PLLC

(57) ABSTRACT

The light emitting diode display device of the present invention comprises a circuit module and a frame. An upper and a lower layer of circuit board, forming a protruded circuit board, constitute the circuit module. The protruded circuit board has at least two sides having differential length and thereby forming an indention. Each button flange of the frame is fit into the indention to enable the sidewall of the frame come in contact with the upper and the lower circuit board, thus the welding efficiency can be substantially increased. Further, conductive glue or a metallic pin is used to fit the frame onto the protruded circuit board, or a tin solder material is used to weld the elements for jointing elements thereof. Accordingly, the sidewall of the frame will not flit up or become loose easily. Thus, due to the steady assembly, the structure of the display device is not only reinforced but also resin-leakage problem can be resolved.

13 Claims, 4 Drawing Sheets

LIGHT EMITTING DIODE DISPLAY DEVICE

BACKGROUND OF THE INVENTION

1. The Field of the Invention

The present invention generally relates to a structure of surface-adhered the light emitting diode display device, and more particularly, to a light emitting diode display device having a lower circuit board and an upper circuit board stacked on the lower circuit board forming a protruded circuit board, wherein the protruded circuit board is covered by a frame which securely joints with the upper and lower circuit board for effectively preventing the sidewall of the frame of the display device flit outwardly, as well as to reinforce the structure to resist an external force.

2. Description of the Related Art

With the rapid advances in high-tech electronic information industry, several valuable electronic products have advanced functions to provide users prompt service and convenience, leading to a high-tech civilization. When enjoying the pleasure brought such high-tech products, at work or in daily activities, the high-tech products have become a part of users' life. Among these valuable high-tech products, only few of them comprise light-emitting diode display for displaying the execution of speed, time, channel and other operational information.

The general light-emitting diode display has a light-emitting diode crystal and IC on the circuit board, and the arrangement of circuit board may be a single layer or a double layer. The single layer circuit board has copper foil loop or IC, and light-emitting diode crystal positioned on its upper and lower side, with an outer frame covering directly onto the circuit board, or alternatively, a resin is injected to joint the outer frame with the circuit board. For the double layer circuit board, after stacking the two boards, the copper foil loop or IC, and light-emitting diode crystal are set on the circuit board. Next, a frame is directly covered onto the resulting structure or alternatively, a resin is injected to joint the outer frame with the circuit board. Referring to FIGS. 7 and 8, the elevational view of the conventional light-emitting diode display device and the sectional view taken along the line a—a of the structure shown in FIG. 7 respectively are shown. The conventional light-emitting diode display A comprises a circuit board B, an IC B1, a light-emitting diode crystal, and a frame C. The IC B1 and the light-emitting diode crystal are disposed on the circuit board B, and the frame C is directly covered onto the circuit board B and a resin D is injected securely adhere the frame C to the circuit board B. However, such conventional light-emitting diode display A has the following defects.

The frame C is jointed with the circuit board B (single or double layer) only with one side. Because the joint surface thereof is small, and therefore the jointing cannot be substantially secure.

Because of the small joint surface, the transfiguration or loss of original shape could easily occur due to change of the surrounding temperature, and may result in flitting up of the frame on the sidewall or the frame may come loose.

Because of the weak structure of the sidewall of the frame, the frame could easily flit up or become loose causing loose contact between the IC B1 and the light-emitting diode crystal and thereby adversely affecting the display function of the light-emitting diode display A.

Accordingly, it is highly desirable to improve the structure of the conventional light emitting diode display to overcome the above defects.

SUMMARY OF THE INVENTION

Accordingly, in the view of the foregoing, the present inventor makes a detailed study of related art to evaluate and consider, and uses years of accumulated experience in this field, and through several experiments, to create a new light emitting diode display in order to substantially improve the jointing efficiency of the frame with the circuit board. The present invention provides a novel and cost effective light emitting diode display device.

According to one aspect of the present invention, the light emitting diode display device comprises a circuit module and a frame. An upper and a lower layer of circuit board, forming a protruded circuit board, constitute the circuit module. The protruded circuit board has at least two sides having differential length and thereby forming an indention. Each button flange of the frame is fit into the indention to enable the sidewall of the frame come in contact with the upper and the lower circuit board, thus the welding efficiency can be substantially increased. Further, conductive glue or a metallic pin is used to fit the frame onto the protruded circuit board, or a tin solder material is used to weld the elements for jointing elements thereof. Accordingly, the sidewall of the frame will not flit up or become loose easily. Thus, due to the steady assembly, the structure of the display device is not only reinforced but also resin-leakage problem can be resolved.

According to another aspect of the present invention, the sidewalls of the frame of the light emitting diode display device is welded to the indention of the upper and the lower circuit board of the protruded circuit board. Because the upper circuit board is slightly smaller than the lower circuit board, and the upper circuit board is covered and supported by the sidewall of the frame, thus the frame of the display device is securely joint to the indentation of the upper and the lower circuit boards and will not be shaky.

According to another aspect of the present invention, the indentions of the upper and lower circuit board are designed for the sidewalls of the frame for support, and also as welding points forming a strong assembly, and therefore when the upper and lower circuit boards are covered and jointed by the frame and resin, the sidewall of the frame will not flit up. Thus, the work life of the light emitting diode display device can be prolonged.

BRIEF DESCRIPTION OF THE DRAWING

For a more complete understanding of the present invention, reference will now be made to the following detailed description of preferred embodiments taken in conjunction with the accompanying drawings, in which.

DETAILED DESCRIPTION OF PREFERRED EMBODIMENTS

Figure 1:
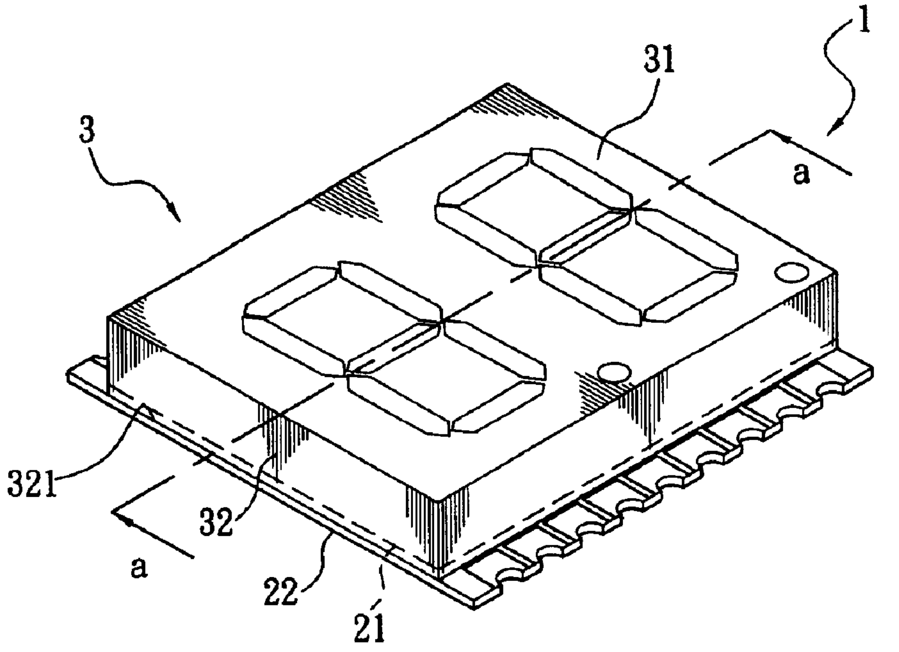
FIG. 1 is an elevational view a light emitting diode display device of the present invention.

Reference will be made in detail to the preferred embodiments of the invention, examples of which are illustrated in the accompanying drawings. Wherever possible, the same reference numbers are used in the drawings and the description to refer to the same or like parts.

Figure 2:
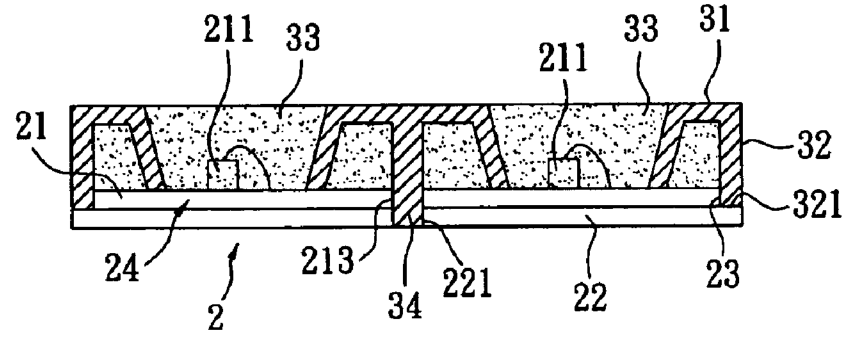
FIG. 2 is a sectional view taken along the line a—a of the structure shown in FIG. 1.
Figure 3:
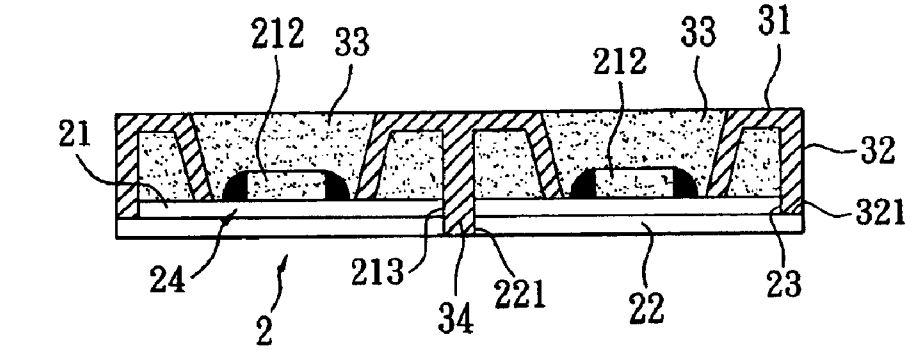
FIG. 3 is a sectional side view of the light emitting diode display device according to a first preferred embodiment of the present invention.

Referring to FIGS. 1, 2 and 3, the elevational view, the sectional view taken along the line a—a of structure shown in FIG. 1 and the sectional side view respectively of the first preferred embodiment of the present invention are shown. The display device 1 comprises a circuit module 2 and a frame 3.

The circuit module 2 comprises an upper circuit board 21 and a lower circuit board 22. The upper circuit board 21 comprises a light-emitting diode crystal 211 and an IC 212, and an upper positioning hole 213 is positioned at a suitable location. The lower circuit board 22 comprises a lower positioning hole 221 corresponding to the upper positioning hole 213. The upper circuit board 21 is slightly smaller than the lower one 22, and the length of sides of these two circuit boards 21, 22 are different so that indentions 23 are formed. To fit the upper and lower circuit boards 21, 22 together, conductive glue or metallic pin or a tin solder material, is used for substantially securing the upper and lower circuit boards 21, 22 to form a protruded circuit board 24.

The light emitting diode display device of the present invention further comprises a display face 31 is for showing variety of numbers, patterns or fonts. A sidewall 32 extends downwards from each of the display face 31, and each sidewall 32 has a button flange 321 for jointing with the other element. The frame 3 is a hollow box-shaped figure, which has a space 33 and positioning element 34.

To assemble the above elements, the frame 3 is covered onto the protruded circuit board 24, and bottom flanges 321 of each sidewall 32 will be supporting onto the indentation 23 of the protruded circuit board 24 to enable the frame 3 to support against the indention 23 of the upper and lower circuit boards 21, 22 of the protruded circuit board 24 by the sidewall 32. Meanwhile, the upper circuit board 21 of the protruded circuit board 24 is able to fit into the space 33 of the frame 3 as well as the light-emitting diode crystal 211 and IC 212. Further, the positioning element 34 within the frame 3 is used to fit into the upper positioning hole 213 of the upper circuit board 21 and the lower positioning hole 221 of the lower circuit board 22, thus the upper and lower circuit boards 21, 22 are jointed together and substantially positioned by the positioning element 34 to substantially prevent from undesirable movements. Next, a resin or glue or screws are used to securely joint the frame 3 with the protruded circuit board 24. Thus, the assembly of the light emitting diode display device 1 is completed.

The circuit module 2 may comprise a plurality of stacked circuit boards, and each circuit board can be pressed, riveted or welded to joint with each other. The configuration of stacked circuit boards is designed in a manner that sizes of the circuit boards increase in an orderly manner from the upper layer to the lower layer.

The protruded circuit board 24 of the circuit module 2 can be made of metal, bakelite, fiber, insulation material or other various materials.

Because the sidewall 32 of the frame 3 of the display device 1 has button flanges 321 supporting to the indentions 23 of the protruded circuit board 24, the welding phase is accordingly larger. Further, the use of resin, glue or screws, will render the assembly secure so that the sidewall 32 of the frame 3 is prevented from flipping up. Because the sidewall 32 of the frame 3 is securely jointed to the upper and lower circuit board 21 and 22 of the protruded circuit board 24, and the positioning element 34 of the frame 3 is fit into the upper positioning hole 213 of the upper circuit board 21 and the lower positioning hole 221 of the lower circuit board 22, the frame 3 is able to position on the top of the upper and lower circuit boards 21 and 22 of the protruded circuit board 24 and further allows the light-emitting diode crystal 211 or IC 212 to positioned on the top of the upper circuit board 21 to emit then project to the display face 31 of the frame 3.

Figure 4:
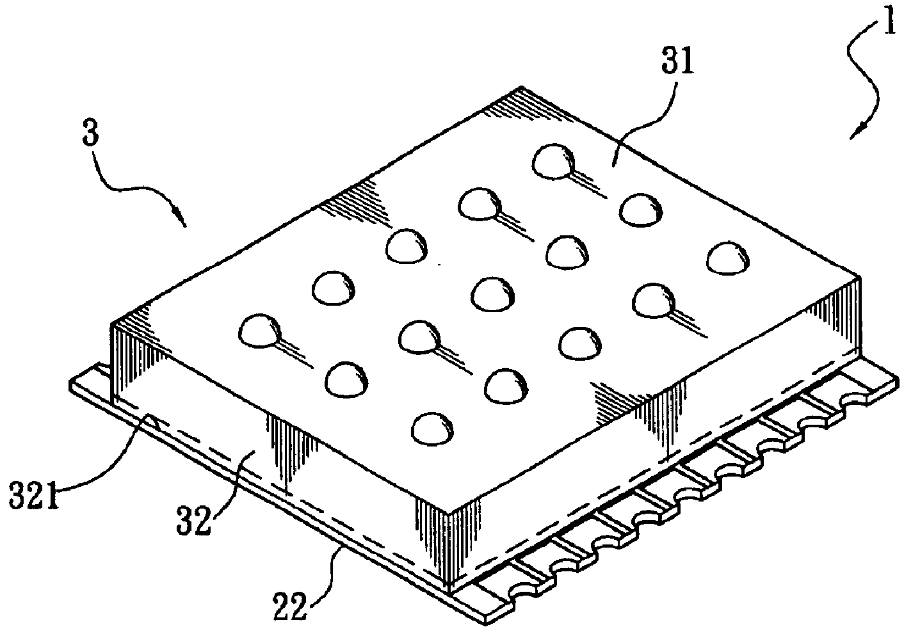
FIG. 4 is an elevational view of a light emitting diode display device according to a second preferred embodiment of the present invention.
Figure 5:
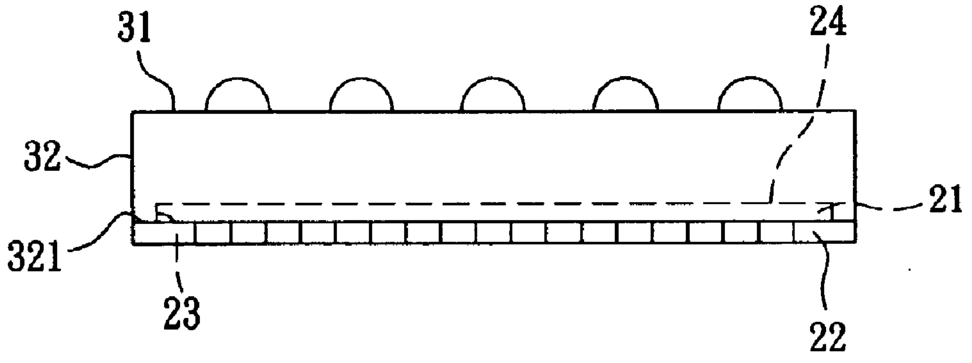
FIG. 5 is a side view of the light emitting diode display device according to the second preferred embodiment of the present invention.
Figure 6:
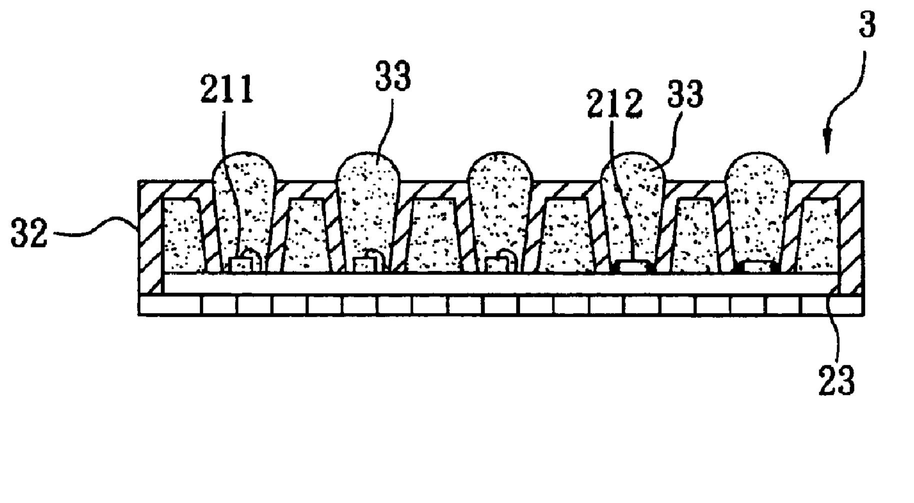
FIG. 6 is the sectional side view of the light emitting diode display device according to the second preferred embodiment of the present invention.
Figure 7:
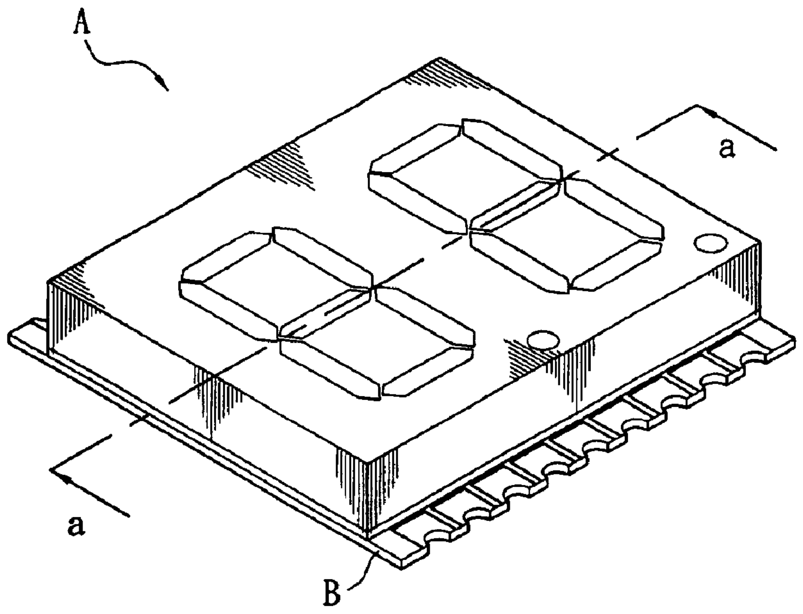
(PRIOR ART) FIG. 7
FIG. 7 is an elevational view of a conventional light-emitting diode display device.
Figure 8:
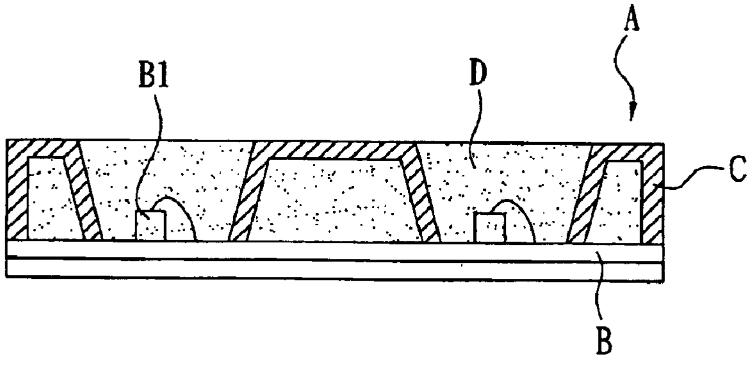
(PRIOR ART) FIG. 8
FIG. 8 is a sectional view taken along the line a—a of the structure shown in FIG. 7.

Referring to FIGS. 4, 5 and 6, the elevational view, side view and sectional side view respectively, of the light emitting diode display device according to a second preferred embodiment of the present invention is shown. The light emitting diode display device 1 comprises the frame 3 with the display face 31, and the display face 31 has a plurality of spaces 33. The protruded circuit board 24 comprises the upper circuit board 21 having a plurality of the light-emitting diode crystal 211 and IC 212 corresponding to the space 33, to enable the display face 31 to have light emitting capability for the display function.

The above description is merely exemplified by preferred embodiment and therefore not limiting the scope of the present invention, wherein the protruded circuit board is constituted of circuit module, the display device has a frame securely positioned into the protruded circuit board, thus the sidewall of the frame will not flip up or become loose after welding to the protruded circuit board. With such strong assembly, the display device can substantially have a firmer structure and longer work life.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

What is claimed is:

1. A light emitting diode display device, comprising:

a circuit module, having an upper circuit board and a lower circuit board joint together to form a protruded circuit board; and a frame, covering said circuit module, wherein said frame comprises a display face, and a sidewall on each side thereof, wherein said sidewall comprises a button flange for jointing with other element, and a space, wherein said upper circuit board is smaller than the lower circuit board, and a length of a side of said upper circuit board is different from a length of a side of said lower circuit board and thereby forming an indentation so that said frame can be supported by said indentation, and wherein said upper circuit board is covered by said frame and a resin for secure assembly.

2. The light emitting diode display device according to claim 1, wherein said upper and lower circuit boards have at least two sides jointed together to form said indention.

3. The light emitting diode display device according to claim 1, wherein said upper circuit board of said protruded circuit board comprises a plurality of integrated circuits.

4. The light emitting diode display device according to claim 1, wherein said upper circuit board of said protruded circuit board comprises a plurality of light-emitting diode crystals.

5. The light emitting diode display device according to claim 1, wherein said circuit module is comprised of a plurality of orderly stacked circuit boards.

6. The light emitting diode display device according to claim 5, wherein the sizes of said stacked circuit boards from the top to the bottom increase in an orderly manner.

7. The light emitting diode display device according to claim 1, wherein said protruded circuit board is made of metallic material.

8. The light emitting diode display device according to claim 1, wherein said protruded circuit board is made of bakelite.

9. The light emitting diode display device according to claim 1, wherein said protruded circuit board is made of fiber material.

10. The light emitting diode display device according to claim 1, wherein said protruded circuit board is made of insulation material.

11. The light emitting diode display device according to claim 1, wherein said upper and lower circuit boards are jointed together by pressing.

12. The light emitting diode display device according to claim 1, wherein said upper and lower circuit boards are jointed together by using rivets.

13. The light emitting diode display device according to claim 1, wherein said upper and lower circuit boards are jointed together by welding.

* * * * *